US012770244B2

(12) United States Patent
Suzuki et al.

(10) Patent No.: US 12,770,244 B2
(45) Date of Patent: Oct. 20, 2026

(54) COMPONENT MOUNTING SYSTEM AND IMAGE CLASSIFICATION METHOD

(71) Applicant: FUJI CORPORATION, Chiryu (JP)

(72) Inventors: Mikiya Suzuki, Nishio (JP); Kazuya Kotani, Toyota (JP); Takahiro Kobayashi, Chiryu (JP); Yuki Inaura, Chiryu (JP)

(73) Assignee: FUJI CORPORATION, Chiryu (JP)

(*) Notice: Subject to any disclaimer, the term of this patent is extended or adjusted under 35 U.S.C. 154(b) by 135 days.

(21) Appl. No.: 18/849,589

(22) PCT Filed: Apr. 8, 2022

(86) PCT No.: PCT/JP2022/017398
§ 371 (c)(1),
(2) Date: Sep. 23, 2024

(87) PCT Pub. No.: WO2023/195173
PCT Pub. Date: Oct. 12, 2023

(65) Prior Publication Data

US 2025/0209606 A1 Jun. 26, 2025

(51) Int. Cl.
*G06T 7/00* (2017.01)
*G06T 7/73* (2017.01)

(52) U.S. Cl.
CPC .............. *G06T 7/0008* (2013.01); *G06T 7/73* (2017.01); *G06T 2207/20081* (2013.01); *G06T 2207/30152* (2013.01)

(58) Field of Classification Search
CPC . G06T 2207/20081; G06T 2207/30152; G06T 7/0008; G06T 7/73
USPC .......................................................... 382/152
See application file for complete search history.

(56) References Cited

U.S. PATENT DOCUMENTS

2020/0290043 A1* 9/2020 Williamson ...... B01L 3/502715

FOREIGN PATENT DOCUMENTS

| | | | | |
|---|---|---|---|---|
| DE | 112023005964 T5 * | 1/2026 | ........... G06T 3/4053 |
| WO | WO-2021166230 A1 * | 8/2021 | ......... H05K 13/0812 |
| WO | WO 2021/205578 A1 | 10/2021 | |
| WO | WO-2022044075 A1 * | 3/2022 | ............. H05K 13/02 |

OTHER PUBLICATIONS

International Search Report issued on Jun. 21, 2022, in PCT/JP2022/017398 filed on Apr. 8, 2022, 2 pages.

* cited by examiner

*Primary Examiner* — Behrooz M Senfi
(74) *Attorney, Agent, or Firm* — Oblon, McClelland, Maier & Neustadt, L.L.P.

(57) ABSTRACT

A component mounting system includes cameras that capture images of a pickup state and a mounting state of a component and a component supply position, an error detection section configured to control the camera, and execute at least one of error detection processing based on an image in the pickup state and error detection processing based on an image in the mounting state, an inspection section, and a classification section are provided. The inspection section inspects presence or absence of the component at the component supply position by applying an image before pickup operation to a trained model obtained by machine learning using multiple images before pickup operation as input data and the presence or absence of the component at the component supply position as training data.

4 Claims, 11 Drawing Sheets

COMPONENT MOUNTING SYSTEM AND IMAGE CLASSIFICATION METHOD

TECHNICAL FIELD

The present description discloses a component mounting system and an image classification method.

BACKGROUND ART

Conventionally, a component mounter is known which captures an image of a tape having multiple cavities capable of accommodating components and confirms that the component is absent in the cavities based on the image. For example, Patent Literature 1 discloses a component mounter that captures an image to determine the presence or absence of a component, acquires a feature value from the image, inputs the acquired feature value to a trained model, and determines the presence or absence of the component in a cavity based on an output result by the trained model. The trained model is created by acquiring the feature value from the image of the cavity in which the presence or absence of the component is set in advance and learning using a combination of the feature value and the presence or absence of the component as training data.

CITATION LIST

Patent Literature

Patent Literature 1: WO 2021/205578

SUMMARY OF THE INVENTION

Technical Problem

Incidentally, in order to create a highly accurate trained model, it is necessary to prepare a large amount of training data (a combination of the image of the cavity and the presence or absence of the component). When the operator classifies the training data, the burden on the operator is large because the operator visually classifies a large amount of training data.

The main purpose of the present disclosure is to make it easier to obtain training data used to create a trained model in a component mounting system capable of determining the presence or absence of a component in a cavity.

Solution to Problem

The present disclosure employs the following means in order to achieve the main purpose described above.

A component mounting system according to the present disclosure includes a mounting machine main body including a head holding a pickup member capable of picking up a component supplied from a feeder to a component supply position and a head moving device configured to move the head, the mounting machine main body being capable of mounting the component picked up by the pickup member on a board, one or more cameras configured to capture images of at least one of a pickup state of the component with respect to the pickup member and a mounting state of the component with respect to the board, and the component supply position, a production control section configured to control the head and the head moving device such that a pickup operation of picking up the component by the pickup member and a mounting operation of mounting the component picked up by the pickup member on the board are executed, and control the camera such that a captured image of at least one of the pickup state of the component with respect to the pickup member after the pickup operation and the mounting state of the component with respect to the board after the mounting operation is obtained to produce the board, an error detection section configured to execute at least one of error detection processing of detecting a pickup error based on the captured image in the pickup state and error detection processing of detecting a mounting error based on the captured image in the mounting state during production of the board, an imaging processing section configured to capture an image of the component supply position before the pickup operation by the camera, an inspection section configured to inspect presence or absence of the component at the component supply position by applying the captured image of the component supply position before the pickup operation acquired by the imaging processing section to a trained model obtained by machine learning using multiple captured images of the component supply position before the pickup operation as input data and the presence or absence of the component at the component supply position as training data, and a classification section configured to classify the captured image of the component supply position before the pickup operation into an image to be used as the training data with a component when an error is not detected by the error detection section in the machine learning, and classify the captured image of the component supply position before the pickup operation acquired by the imaging processing section into an image not to be used as the training data with a component when the error is detected by the error detection section.

In the component mounting system according to the present disclosure, when the error is not detected by the error detection section in the machine learning, the captured image of the component supply position before the pickup operation is classified into the image to be used as the training data. Therefore, compared to a case where the operator visually classifies the training data, the training data with a component can be obtained more easily. In addition, in a case where an error is detected by the error detection section, there is a high possibility that the captured image of the component supply position is not suitable as the training data with a component. Therefore, it is significant to classify the captured image of the component supply position before the pickup operation into the image not to be used for the training data with a component.

An image classification method according to the present disclosure used in a component mounting system including a mounting machine main body including a head holding a pickup member capable of picking up a component supplied from a feeder to a component supply position and a head moving device configured to move the head, the mounting machine main body being capable of mounting the component picked up by the pickup member on a board, one or more cameras configured to capture images of at least one of a pickup state of the component with respect to the pickup member and a mounting state of the component with respect to the board, and the component supply position, a production control section configured to control the head and the head moving device such that a pickup operation of picking up the component by the pickup member and a mounting operation of mounting the component picked up by the pickup member on the board are executed, and control the camera such that a captured image of at least one of the pickup state of the component with respect to the pickup member after the pickup operation and the mounting state of the component with respect to the board after the mounting operation is obtained to produce the board, an error detection section configured to execute at least one of error detection processing of detecting a pickup error based on the captured image in the pickup state and error detection processing of detecting a mounting error based on the captured image in the mounting state during production of the board, an imaging processing section configured to capture an image of the component supply position before the pickup operation by the camera, and an inspection section configured to inspect presence or absence of the component at the component supply position by applying the captured image of the component supply position before the pickup operation acquired by the imaging processing section to a trained model obtained by machine learning using multiple captured images of the component supply position before the pickup operation as input data and the presence or absence of the component at the component supply position as training data, the method includes classifying the captured image of the component supply position before the pickup operation into an image to be used as the training data with a component when an error is not detected by the error detection section in the machine learning, and classifying the captured image of the component supply position before the pickup operation acquired by the imaging processing section into an image not to be used as the training data with a component when the error is detected by the error detection section.

In the image classification method of the present disclosure, when the error is not detected by the error detection section in the machine learning, the captured image of the component supply position before the pickup operation is classified into the image to be used as the training data with a component. Therefore, compared to a case where the operator visually classifies the training data, the training data with a component can be obtained more easily. In addition, in a case where an error is detected by the error detection section, there is a high possibility that the captured image of the component supply position is not suitable as the training data with a component. Therefore, it is significant to classify the captured image of the component supply position before the pickup operation into the image not to be used for the training data with a component.

DESCRIPTION OF EMBODIMENTS

Figure 1:
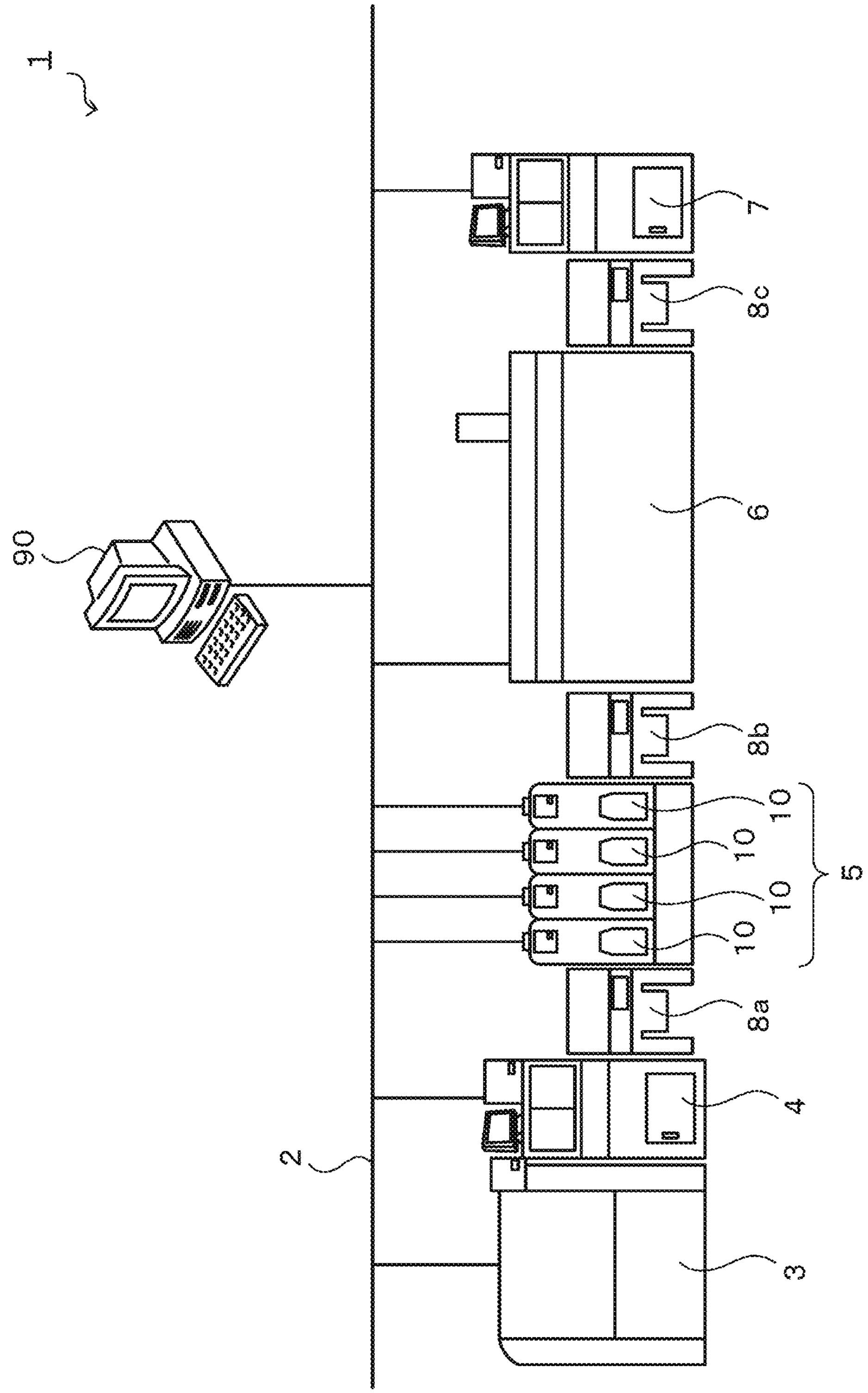
FIG. 1 is a schematic diagram illustrating a configuration of component mounting system 1.
Figure 2:
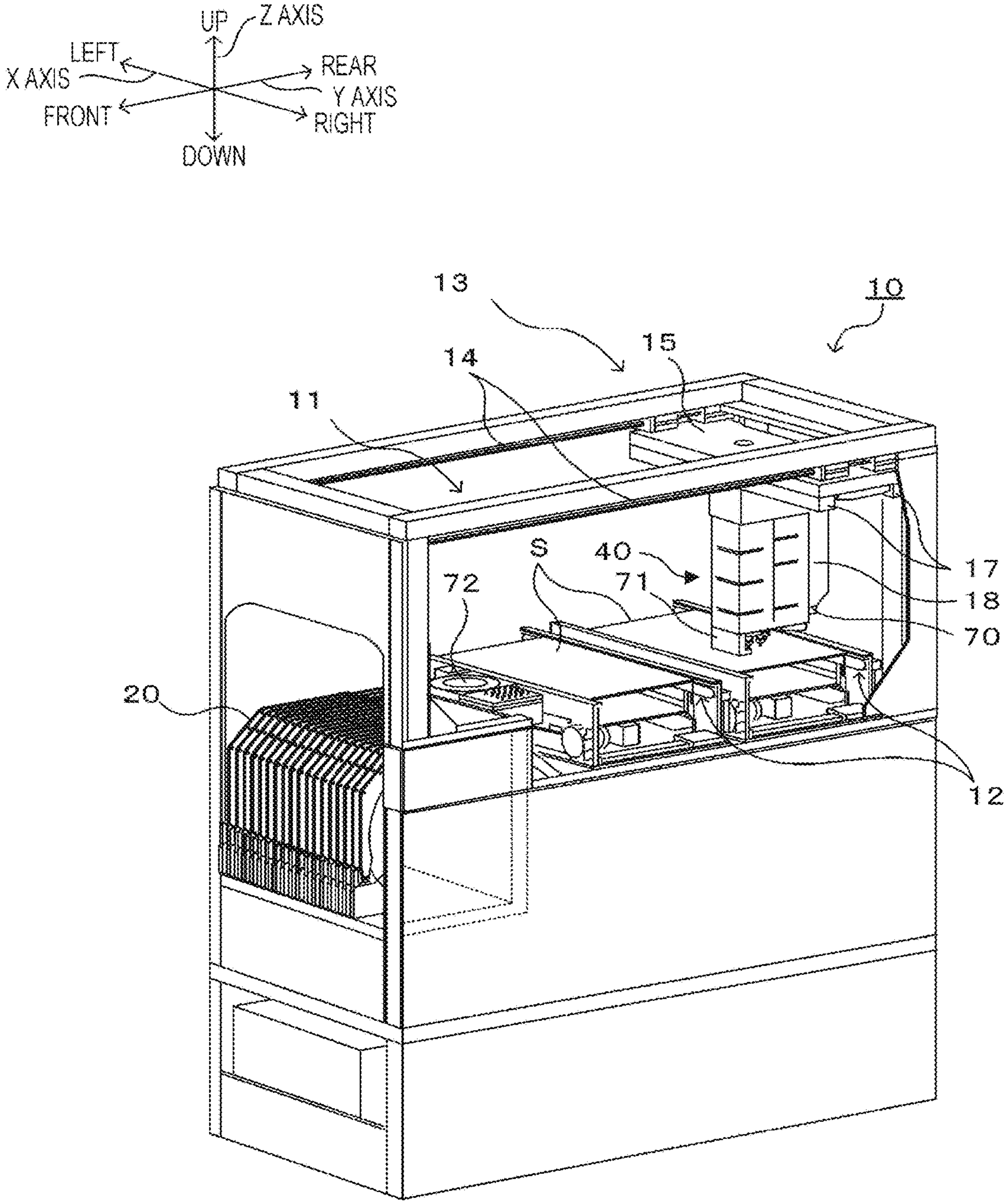
FIG. 2 is a perspective view of component mounter 10.
Figure 3:
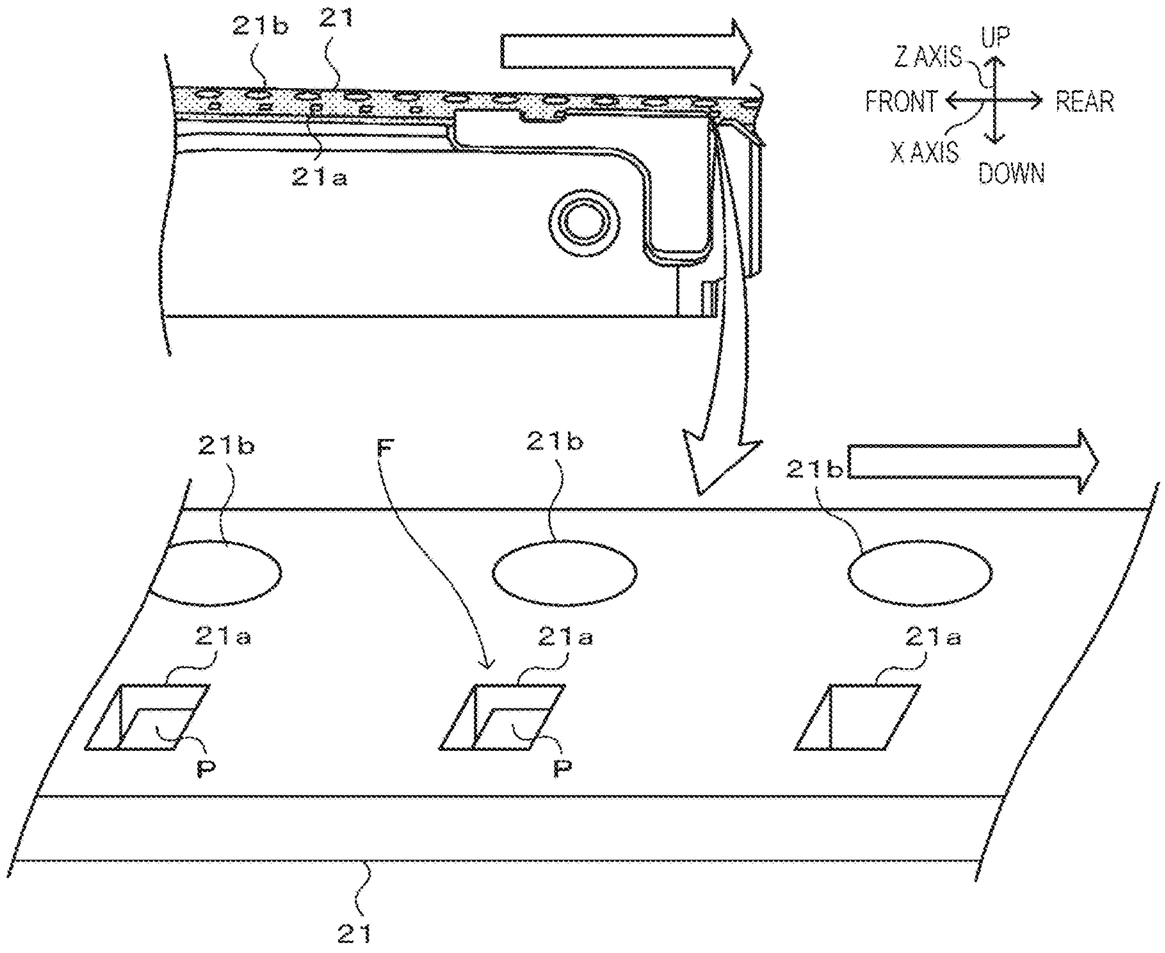
FIG. 3 is a perspective view illustrating component supply position F.
Figure 4:
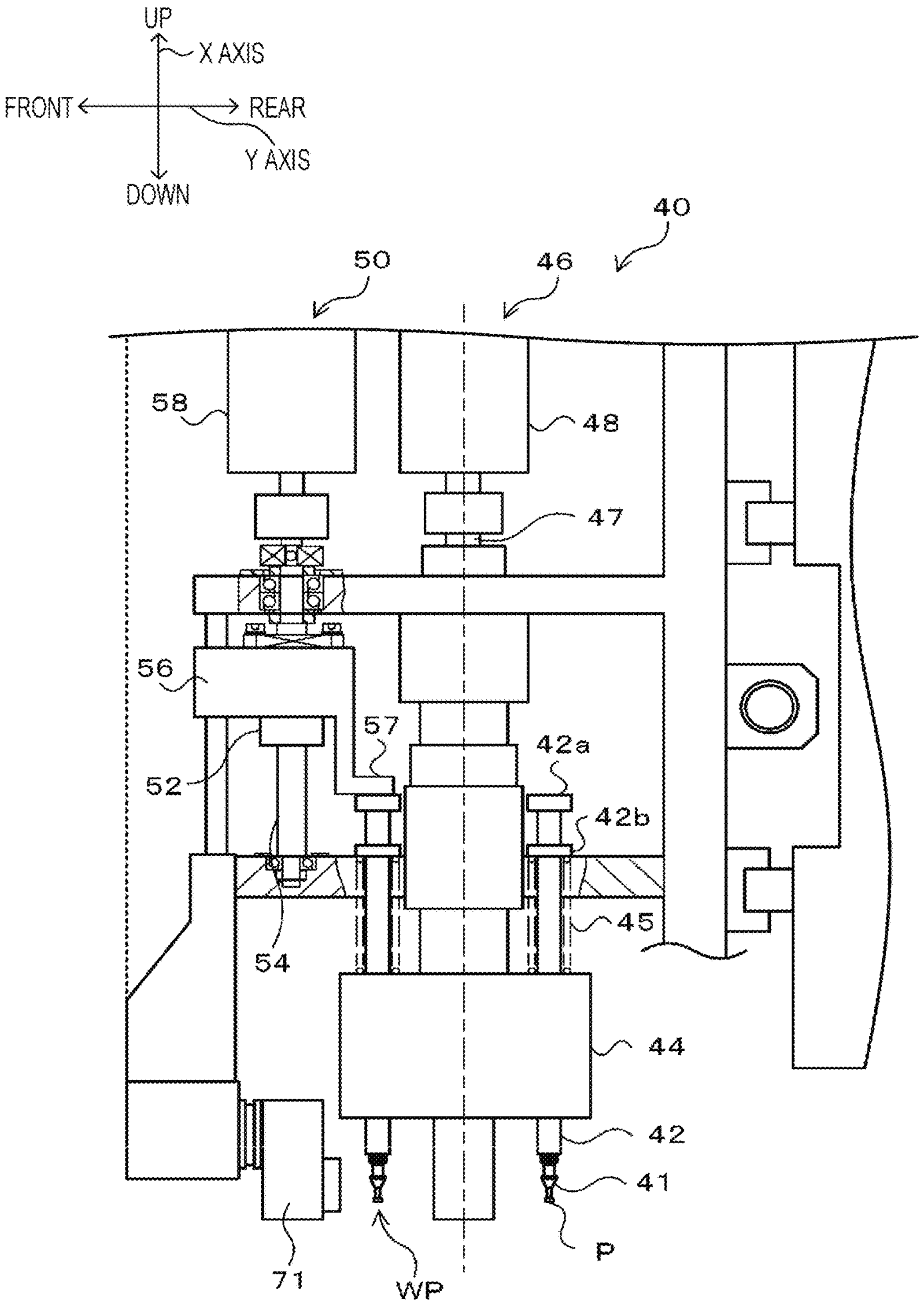
FIG. 4 is a side view illustrating an outline of a configuration of head unit 40.
Figure 5:
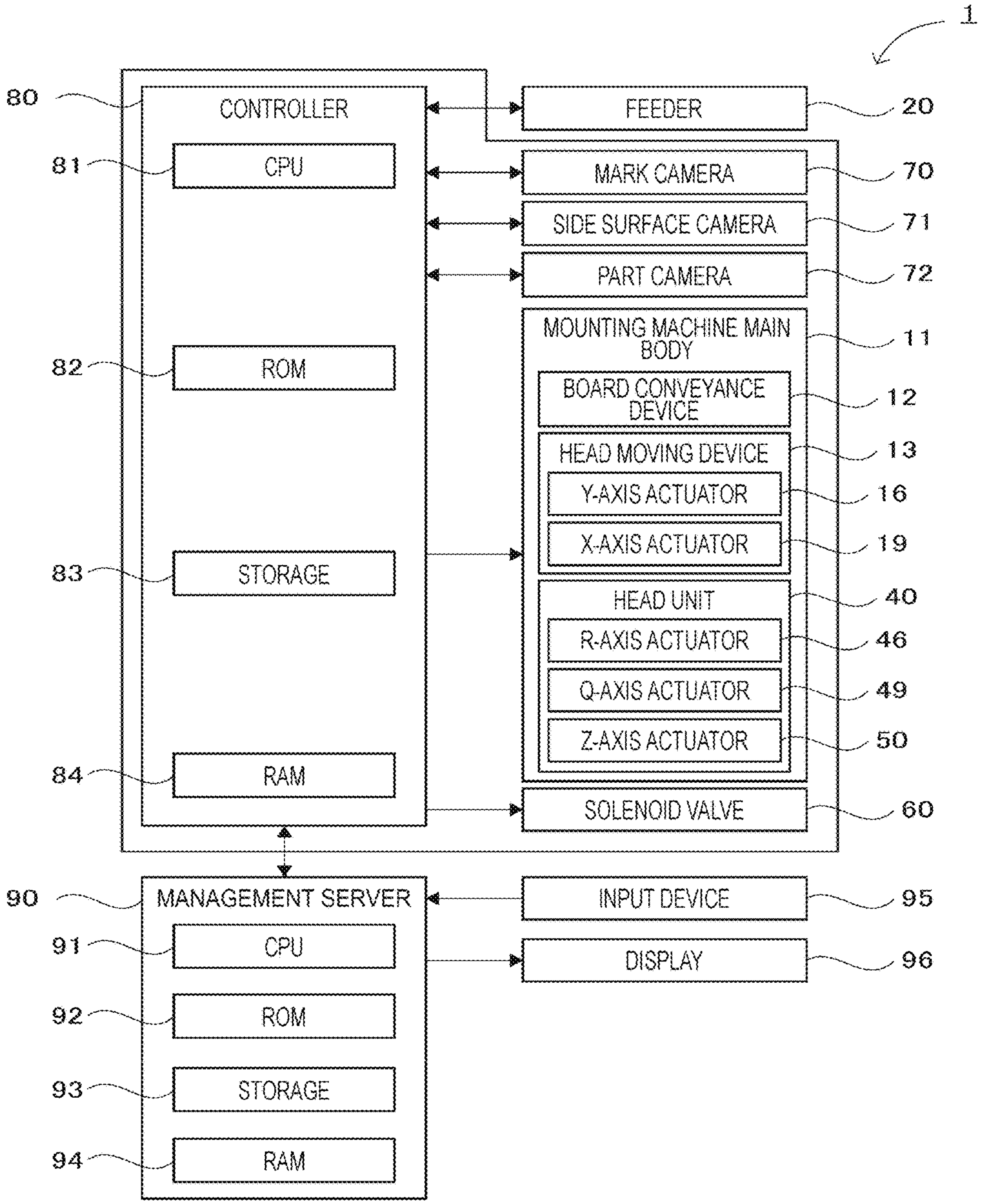
FIG. 5 is a block diagram illustrating an electric connection relationship of component mounting system 1.

Next, an embodiment of the present disclosure will be described with reference to the drawings. FIG. 1 is a schematic diagram illustrating a configuration of component mounting system 1. FIG. 2 is a perspective view of component mounter 10. FIG. 3 is a perspective view illustrating component supply position F. FIG. 4 is a side view illustrating an outline of a configuration of head unit 40. FIG. 5 is a block diagram illustrating an electric connection relationship of component mounting system 1. In the present embodiment, a left-right direction in FIGS. 2 to 4 (direction perpendicular to the paper surface in FIGS. 3 and 4) is an X axis direction, a front-rear direction is a Y axis direction, and an up-down direction is a Z axis direction.

As illustrated in FIG. 1, component mounting system 1 includes solder paste printing device 3, solder paste inspection device 4, mounting line 5, reflow device 6, board visual inspection device 7, and management server 90. Mounting line 5 includes multiple component mounters 10 disposed in a line. Each of these devices is connected to management server 90 via communication network (for example, LAN) 2 so as to be capable of bidirectional communication.

An operation outline of each device constituting component mounting system 1 will be described. Each device executes processing in accordance with a production job transmitted from management server 90. The production job is information for determining which component type of component is to be mounted on which position of board S in which order in each component mounter 10, how many boards S on which the component is mounted, and the like. Solder paste printing device 3 prints a solder paste in a predetermined pattern at a position at which each component is to be mounted on a surface of board S carried from an upstream side, and carries out the solder paste to solder paste inspection device 4 on a downstream side. Solder paste inspection device 4 inspects whether the solder paste is correctly printed on carried board S. Board S on which the solder paste is correctly printed is supplied to component mounter 10 in mounting line 5 via intermediate conveyor 8*a*. Multiple component mounters 10 disposed in mounting line 5 perform component mounting on board S in order from the upstream side. Board S on which the mounting of all the components is completed is supplied from component mounter 10 to reflow device 6 via intermediate conveyor 8*b*. In reflow device 6, the solder paste on board S is melted and then solidified, so that each component is fixed on board S. Board S carried out from reflow device 6 is carried into board visual inspection device 7 via intermediate conveyor 8*c*. Board visual inspection device 7 determines the normality and abnormality of a visual inspection based on an image for visual inspection obtained by capturing an image of board S on which all the components are mounted.

As illustrated in FIG. 2, component mounter 10 includes mounting device main body 11, mark camera 70, side surface camera 71 (refer to FIG. 4), part camera 72, and controller 80 (refer to FIG. 5).

Mounting device main body 11 picks up component P supplied from feeder 20 and mounts component P on board S. Mounting device main body 11 includes board conveyance device 12, head moving device 13, and head unit 40.

Feeder 20 has a tape reel on which tape 21 is wound, and feeds tape 21 from the tape reel by a tape feeding mechanism (not illustrated) to feed tape 21 to component supply position F. As illustrated in FIG. 3, tape 21 is formed with cavity 21*a* and sprocket hole 21*b* at predetermined intervals along a longitudinal direction thereof. Component P is accommodated in cavity 21*a*. A sprocket of the tape feeding mechanism is engaged with sprocket hole 21*b*. Feeder 20 drives the sprocket by a predetermined rotation amount by a motor to feed tape 21 engaged with the sprocket by a predetermined amount, thereby subsequently supplying components P accommodated in tape 21 to the component supply position. Component P accommodated in tape 21 is protected by a film covering the surface of tape 21, and when the film is peeled off before component supply position F, component P is exposed at the component supply position, and component P can be picked up by suction nozzle 41.

Board conveyance device 12 is configured as, for example, a belt conveyor device, and conveys board S from left to right (board conveyance direction) in FIG. 2 by driving the belt conveyor device. A board support device that supports conveyed board S from a rear surface side by a support pin is provided on a center portion of board conveyance device 12 in the board conveyance direction (X axis direction).

Head moving device 13 is a device that moves head unit 40 in the horizontal direction. As illustrated in FIG. 2, head moving device 13 includes Y-axis guide rails 14, Y-axis slider 15, Y-axis actuator 16 (refer to FIG. 5), X-axis guide rails 17, X-axis slider 18, and X-axis actuator 19 (refer to FIG. 5). Y-axis guide rail 14 is provided on the upper portion of mounting device main body 11 along the Y axis direction. Y-axis slider 15 is movable along Y-axis guide rail 14 by driving of Y-axis actuator 16. X-axis guide rail 17 is provided on a lower surface of Y-axis slider 15 along the X axis direction. Head unit 40 is attached to X-axis slider 18, and X-axis slider 18 is movable along X-axis guide rail 17 by driving of X-axis actuator 19. Therefore, head moving device 13 can move head unit 40 in the XY direction.

As illustrated in FIG. 4, head unit 40 includes rotary head 44, R-axis actuator 46, and Z-axis actuator 50.

In rotary head 44, multiple (12 in this case) nozzle holders 42 that hold suction nozzles 41 are disposed at predetermined angular intervals (for example, 30 degrees) on a circumference coaxial with a rotation shaft. Nozzle holder 42 is configured as a hollow cylindrical member that extends in the Z axis direction. Upper end portion 42*a* of nozzle holder 42 is formed in a cylindrical shape having a larger diameter than the shaft portion of nozzle holder 42. In addition, nozzle holder 42 is formed with flange section 42*b* having a larger diameter than the shaft portion at a predetermined position below upper end portion 42*a*. Spring (coil spring) 45 is disposed between a circular annular surface below flange section 42*b* and a recess (not illustrated) formed in an upper surface of rotary head 44. Therefore, spring 45 urges nozzle holder 42 (flange section 42*b*) upward with the recess on the upper surface of rotary head 44 serving as a spring receiver. Rotary head 44 includes Q-axis actuator 49 (refer to FIG. 5) that individually rotates each nozzle holder 42 therein. Although not illustrated, Q-axis actuator 49 includes a drive gear meshed with a gear provided on a cylinder outer periphery of nozzle holder 42, and a drive motor connected to a rotation shaft of the drive gear. Therefore, multiple nozzle holders 42 can be individually rotated around the axis (Q direction), so that each suction nozzle 41 can also be individually rotated. Suction nozzle 41 is connected to a vacuum pump or an air pipe via solenoid valve 60 (refer to FIG. 5). Each suction nozzle 41 is capable of applying negative pressure to a suction port to pick up component P by driving solenoid valve 60 such that the suction port communicates with the vacuum pump, and is capable of applying positive pressure to the suction port to release the pickup of component P by driving solenoid valve 60 such that the suction port communicates with the air pipe.

R-axis actuator 46 includes rotation shaft 47 connected to rotary head 44, and drive motor 48 connected to rotation shaft 47. R-axis actuator 46 intermittently rotates rotary head 44 by a predetermined angle by intermittently driving drive motor 48 by a predetermined angle (for example, 30 degrees). As a result, each nozzle holder 42 disposed in rotary head 44 is pivoted and moved by a predetermined angle in the circumferential direction. Here, when nozzle holder 42 is positioned at predetermined work position WP (position in FIG. 4) among multiple movable positions, nozzle holder 42 picks up component P supplied from feeder 20 to component supply position F by suction nozzle 41 or places component P picked up by suction nozzle 41 on a predetermined disposition position on board S.

Z-axis actuator 50 is configured as a feed screw mechanism including screw shaft 54 that extends in the Z axis direction to move ball screw nut 52, Z-axis slider 56 attached to ball screw nut 52, and drive motor 58 of which a rotation shaft is connected to screw shaft 54. Z-axis actuator 50 moves Z-axis slider 56 in the Z axis direction by rotationally driving drive motor 58. Substantially L-shaped lever section 57 that protrudes to a side of rotary head 44 is formed in Z-axis slider 56. Lever section 57 can abut on upper end portion 42*a* of nozzle holder 42 positioned within a predetermined range including work position WP. Therefore, when lever section 57 is moved in the Z axis direction in accordance with the movement of Z-axis slider 56 in the Z axis direction, nozzle holder 42 (suction nozzle 41) positioned within the predetermined range can be moved in the Z axis direction.

As illustrated in FIG. 2, mark camera 70 is provided on a lower surface of X-axis slider 18. Mark camera 70 has an imaging range below, and captures an image of a target object from above to generate a captured image. Examples of the capturing target object of mark camera 70 include component P held by tape 21 fed out from feeder 20, a mark attached to board S, and component P after being mounted on board S.

Side surface camera 71 is a camera that captures, from the side surface, images of suction nozzle 41 stopped at work position WP and the pickup state of component P with respect to suction nozzle 41. As illustrated in FIG. 4, side surface camera 71 is provided below head unit 40.

Part camera 72 has an imaging range above, and captures an image of the pickup state of component P with respect to suction nozzle 41 from below component P to generate a captured image. As illustrated in FIG. 2, part camera 72 is disposed between feeder 20 and board conveyance device 12.

As illustrated in FIG. 5, controller 80 is configured as a microprocessor centered on CPU 81, and includes ROM 82, storage (for example, HDD or SSD) 83, RAM 84, and the like, in addition to CPU 81. Image signals from mark camera 70, side surface camera 71, and part camera 72 are input to controller 80. Each of X-axis slider 18, Y-axis actuator 16, R-axis actuator 46, Q-axis actuator 49, and Z-axis actuator 50 is equipped with a position sensor (not illustrated), and position information from these position sensors is input to controller 80. In addition, controller 80 outputs control signals to mark camera 70, side surface camera 71, and part camera 72. Furthermore, controller 80 outputs drive signals to feeder 20, board conveyance device 12, Y-axis actuator 16, X-axis actuator 19, R-axis actuator 46, Q-axis actuator 49, Z-axis actuator 50, solenoid valve 60, and the like.

As illustrated in FIG. 5, management server 90 includes CPU 91, ROM 92, storage 93 which stores, for example, a production job of board S, RAM 94, and the like. An input signal from input device 95 such as a mouse or a keyboard is input to management server 90. In addition, management server 90 outputs an image signal to display 96.

Figure 6:
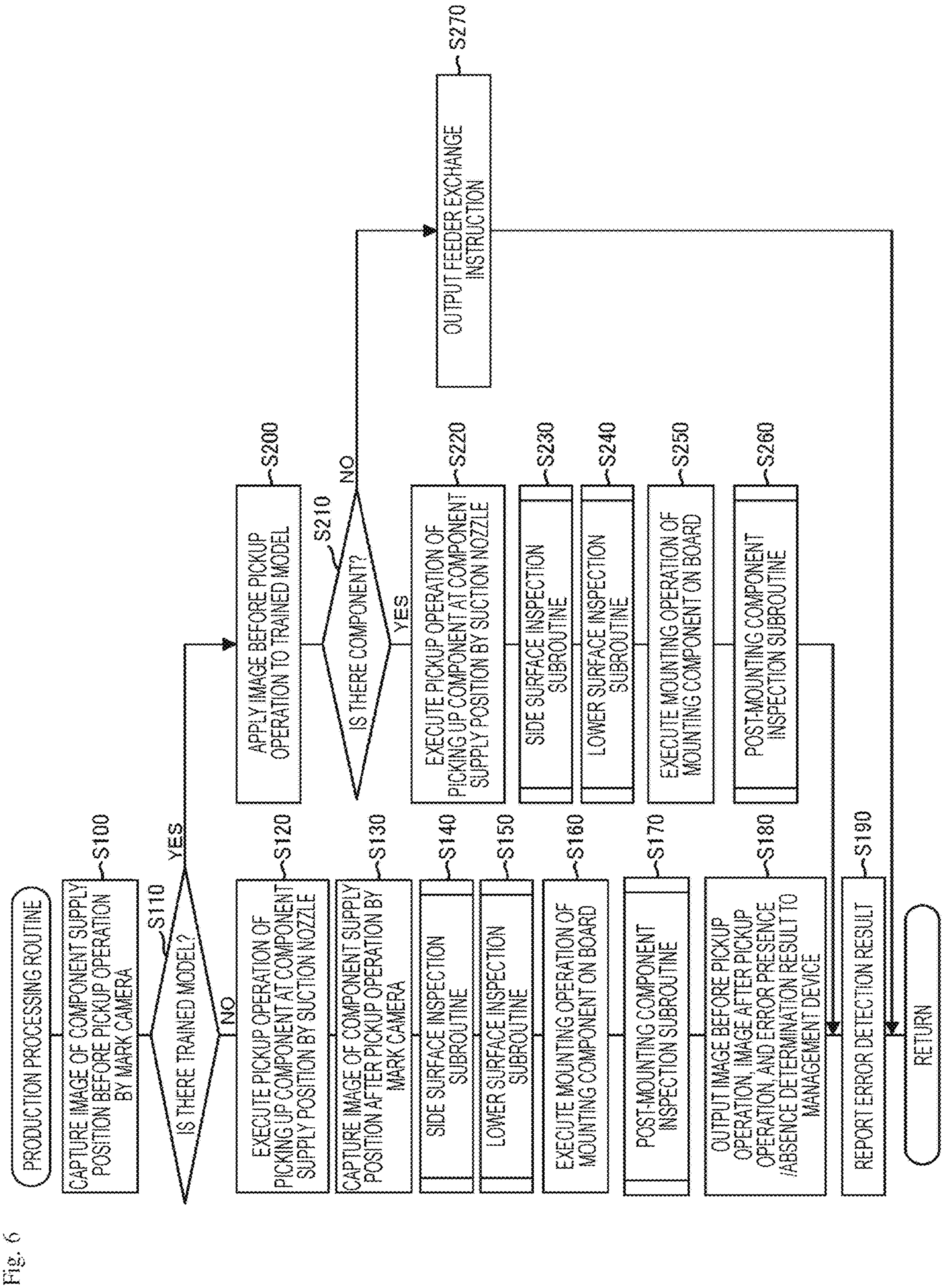
FIG. 6 is a flowchart illustrating an example of a production processing routine.
Figure 7:
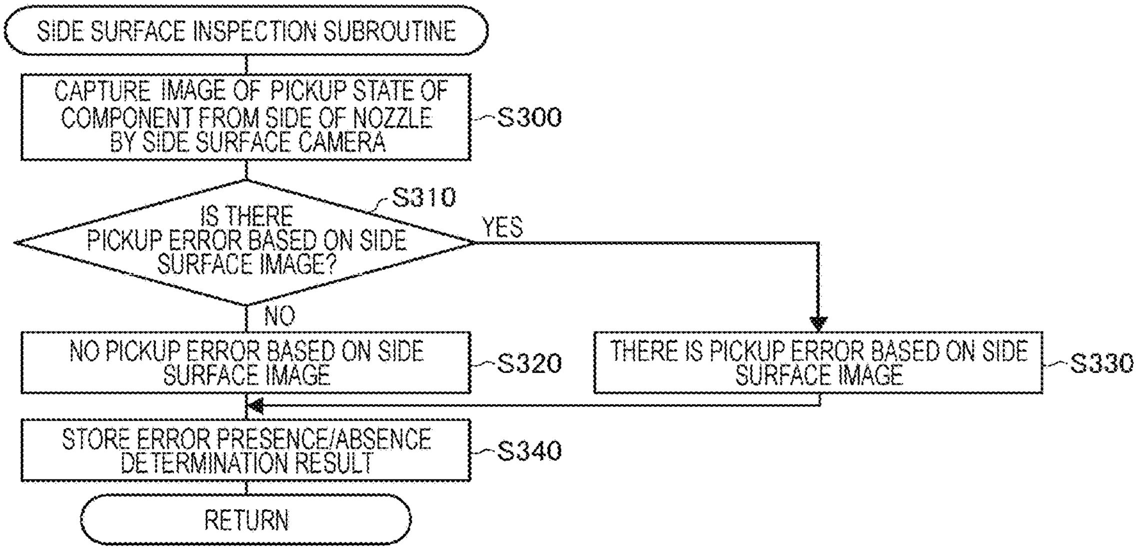
FIG. 7 is a flowchart illustrating an example of a side surface inspection subroutine.
Figure 8:
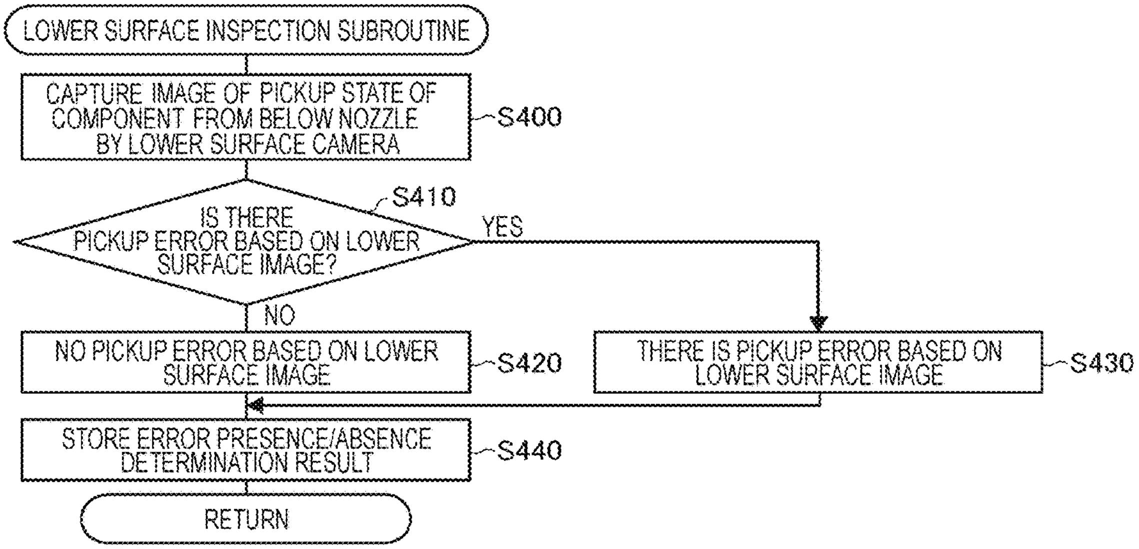
FIG. 8 is a flowchart illustrating an example of a lower surface inspection subroutine.
Figure 9:
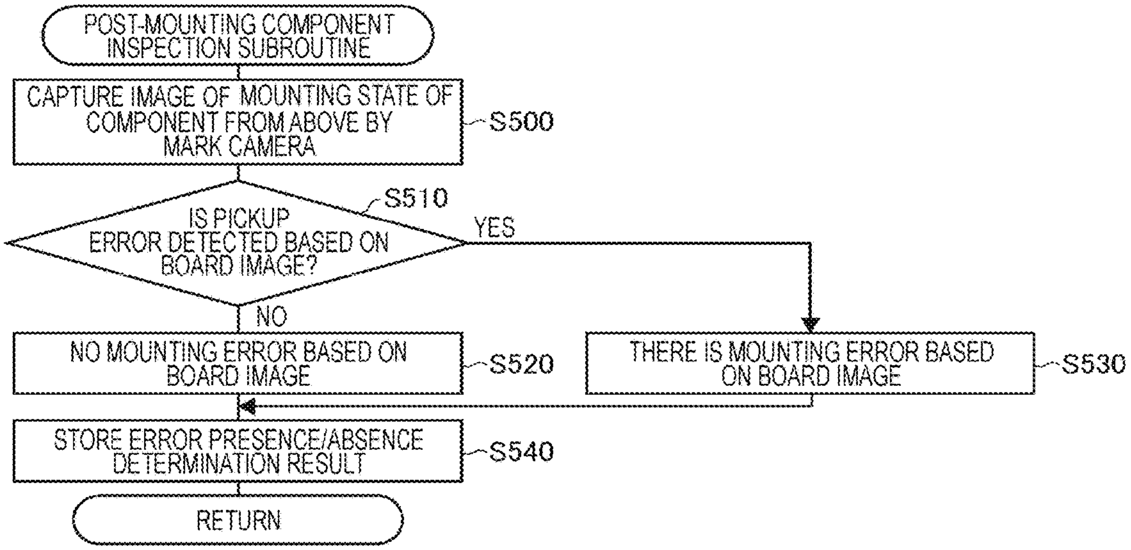
FIG. 9 is a flowchart illustrating an example of a post-mounting component inspection subroutine.
Figure 10:
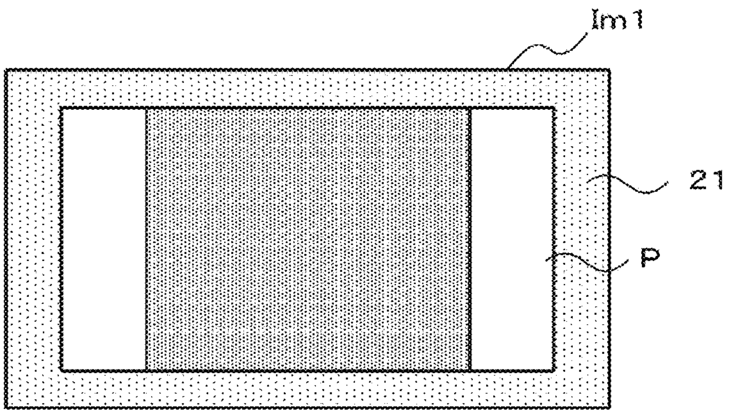
FIG. 10 is a diagram illustrating an example of image before pickup operation Im1.
Figure 11:
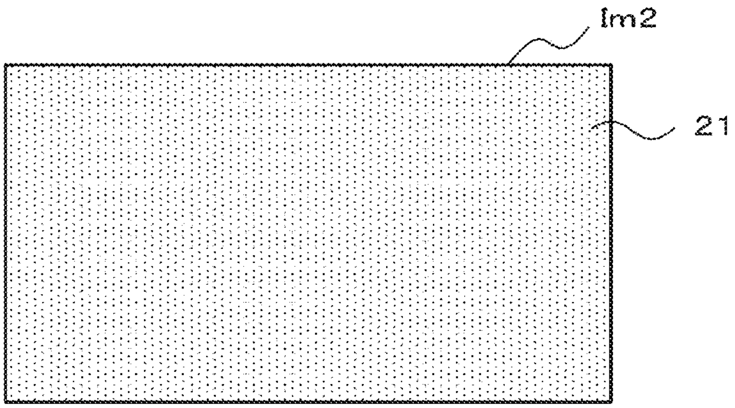
FIG. 11 is a diagram illustrating an example of image after pickup operation Im2.
Figure 12:
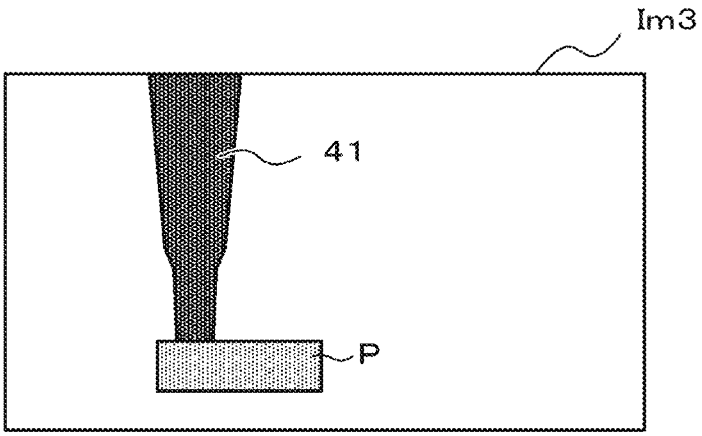
FIG. 12 is a diagram illustrating an example of side surface image Im3.
Figure 13:
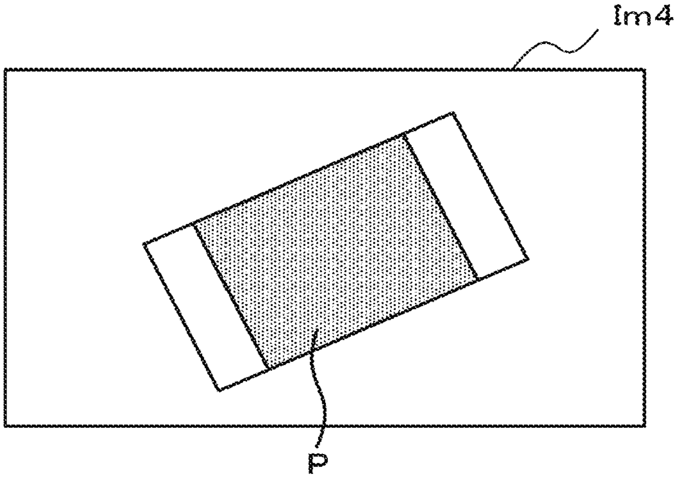
FIG. 13 is a diagram illustrating an example of lower surface image Im4.
Figure 14:
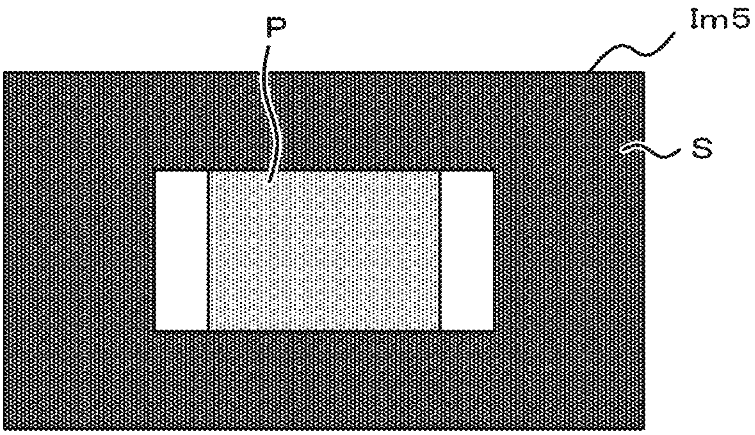
FIG. 14 is a diagram illustrating an example of board image Im5.

Next, the operation of component mounter 10 will be described with reference to FIGS. 6 to 14. FIG. 6 is a flowchart illustrating an example of a production processing routine. FIG. 7 is a flowchart illustrating an example of a side surface inspection subroutine. FIG. 8 is a flowchart illustrating an example of a lower surface inspection subroutine. FIG. 9 is a flowchart illustrating an example of a post-mounting component inspection subroutine. FIG. 10 is a diagram illustrating an example of image before pickup operation Im1. FIG. 11 is a diagram illustrating an example of image after pickup operation Im2. FIG. 12 is a diagram illustrating an example of side surface image Im3. FIG. 13 is a diagram illustrating an example of lower surface image Im4. FIG. 14 is a diagram illustrating an example of board image Im5. The production processing routine is stored in storage 83, and is started when a production job is received from management server 90 and the start of production is instructed.

When the routine is started, CPU 81 first controls X-axis actuator 19 and Y-axis actuator 16 such that mark camera 70 moves to a position directly above component supply position F. CPU 81 controls mark camera 70 such that an image of component supply position F before the pickup operation is captured (S100). In the present embodiment, the image is referred to as image before pickup operation Im1. An example of image before pickup operation Im1 is illustrated in FIG. 10.

Next, CPU 81 determines whether a trained model is stored in storage 83 (S110). The trained model is used to input image before pickup operation Im1 and determine whether the input image before pickup operation Im1 includes component P. The trained model is created by learning an image captured by mark camera 70 and data on the presence of the component in the image (training data with a component), and an image captured by mark camera 70 and data on the absence of the component in the image (training data without a component) through machine learning. The trained model is created for each combination of the tape type which is the type of tape 21 and the component type which is the type of component P.

When a negative determination is made in S110, CPU 81 executes a pickup operation of picking up component P at component supply position F by suction nozzle 41 (S120). Specifically, CPU 81 controls X-axis actuator 19 and Y-axis actuator 16 such that work position WP of rotary head 44 is moved to a position directly above component supply position F of feeder 20, controls Z-axis actuator 50 such that suction nozzle 41 at work position WP is lowered, and controls solenoid valve 60 such that negative pressure is applied to suction nozzle 41 to pick up component P.

Next, CPU 81 controls X-axis actuator 19 and Y-axis actuator 16 such that mark camera 70 moves to a position directly above component supply position F. CPU 81 controls mark camera 70 such that an image of component supply position F after the pickup operation is captured (S130). In the present embodiment, the image is referred to as image after pickup operation Im2. An example of image after pickup operation Im2 is illustrated in FIG. 11.

Next, CPU 81 executes a side surface inspection subroutine illustrated in FIG. 7 (S140). When the side surface inspection subroutine is started, CPU 81 controls side surface camera 71 such that an image of the pickup state of component P is captured from the side of suction nozzle 41 at work position WP (S300). In the present embodiment, the image is referred to as side surface image Im3. An example of side surface image Im3 is illustrated in FIG. 12.

CPU 81 determines whether there is a pickup error based on side surface image Im3 (S310). The processing of determining whether there is a pickup error based on side surface image Im3 is executed as follows, for example. That is, when component P is captured at the tip end of suction nozzle 41 and the length of captured component P in the up-down direction is within the allowable range, CPU 81 makes a negative determination in S310 and determines that there is no pickup error based on side surface image Im3 (S320). Otherwise, CPU 81 makes an affirmative determination in S310, and determines that there is a pickup error based on side surface image Im3 (S330). For example, in a case where component P has a rectangular parallelepiped shape, when component P is required to be picked up such that a longitudinal direction thereof is horizontal, but the longitudinal direction of component P is oblique, the length of captured component P in the up-down direction exceeds the allowable range. Therefore, component P obliquely picked up is determined to have a pickup error. After S320 or S330, CPU 81 stores the error presence/absence determination result in storage 83 (S340), and proceeds to S150 of the production processing routine.

Next, as illustrated in FIG. 6, CPU 81 executes a lower surface inspection subroutine illustrated in FIG. 8 (S150). When the lower surface inspection subroutine is started, CPU 81 controls X-axis actuator 19 and Y-axis actuator 16 such that rotary head 44 moves from a position above feeder 20 to a position above part camera 72. CPU 81 controls part camera 72 such that an image of the pickup state of component P with respect to suction nozzle 41 is captured from below suction nozzle 41 (S400). In the present embodiment, the image is referred to as lower surface image Im4. An example of lower surface image Im4 is illustrated in FIG. 13.

CPU 81 determines whether there is a pickup error based on lower surface image Im4 (S410). The processing of determining whether there is a pickup error based on lower surface image Im4 is executed as follows, for example. That is, when component P is captured at the tip end of suction nozzle 41 and the amount of positional deviation of captured component P is within the allowable range, CPU 81 makes a negative determination in S410 and determines that there is no pickup error based on lower surface image Im4 (S420). Otherwise, CPU 81 makes an affirmative determination in S410, and determines that there is a pickup error based on lower surface image Im4 (S430). Here, the amount of positional deviation is used to correct the position of component P when component P is placed at the predetermined disposition position on board S. Therefore, when the amount of positional deviation exceeds the allowable range, it is determined that there is a pickup error of component P with respect to suction nozzle 41. After S420 or S430, CPU 81 stores the pickup error presence/absence determination result in storage 83 (S440), and proceeds to S160 of the production processing routine.

Next, as illustrated in FIG. 6, CPU 81 executes a component mounting operation of mounting component P on board S (S160). Specifically, CPU 81 controls R-axis actuator 46 such that suction nozzle 41 that picks up component P, which is a mounting target, approaches work position WP of rotary head 44, and controls X-axis actuator 19 and Y-axis actuator 16 such that work position WP moves to the mounting position on board S. In addition, CPU 81 controls Z-axis actuator 50 such that suction nozzle 41 at work position WP is lowered, and controls solenoid valve 60 such that positive pressure is applied to suction nozzle 41 and component P is detached from suction nozzle 41 and placed at the mounting position on board S.

After S160, CPU 81 executes a post-mounting component inspection routine illustrated in FIG. 9 (S170). When the post-mounting component inspection routine is started, CPU 81 controls mark camera 70 such that an image of a portion of board S on which component P is mounted after the mounting operation is captured (S500). In the present embodiment, the image is referred to as board image Im5. An example of board image Im5 is illustrated in FIG. 14.

CPU 81 determines whether there is a mounting error based on board image Im5 (S510). The processing of determining whether there is a mounting error based on board image Im5 is executed as follows, for example. That is, when the position of the portion captured in board image Im5 is recognized, and component P falls within the allowable range from the expected mounting position of board S, CPU 81 makes a negative determination in S510 and determines that there is no mounting error based on board image Im5 (S520). Otherwise, CPU 81 makes an affirmative determination in S510, and determines that there is a mounting error based on board image Im5 (S530). After S520 or S530, CPU 81 stores the error presence/absence determination result in storage 83 (S540), and proceeds to S180 of the production processing routine.

Subsequently, as illustrated in FIG. 6, CPU 81 outputs image before pickup operation Im1, image after pickup operation Im2, and an error presence/absence determination result (a result of determining the presence or absence of the pickup error based on side surface image Im3, a result of determining the presence or absence of the pickup error based on lower surface image Im4, and a result of determining the presence or absence of the mounting error based on board image Im5) to management server 90 (S180). After these pieces of information are input, management server 90 stores image before pickup operation Im1, image after pickup operation Im2, and the error presence/absence determination result in storage 93 in association with each other.

Here, processing when an affirmative determination is made in S110 will be described. When an affirmative determination is made in S110, CPU 81 applies image before pickup operation Im1 as input data to the trained model (S200).

Next, CPU 81 determines whether component P is present in image before pickup operation Im1 based on the output result of the trained model (S210). When an affirmative determination is made in S210, CPU 81 executes a pickup operation of picking up component P at component supply position F by suction nozzle 41 (S220), executes a side surface inspection subroutine (S230), executes a lower surface inspection subroutine (S240), executes a component mounting operation of mounting component P on board S (S250), and executes a post-mounting component inspection subroutine (S260). The processing of S220 to S260 is the same as the processing of S130 to S170.

After S180 or S260, CPU 81 reports an error presence/absence determination result (S190). Specifically, CPU 81 displays the error presence/absence determination result on a display device (not illustrated) of component mounter 10.

On the other hand, when a negative determination is made in S210, CPU 81 outputs an exchange instruction of feeder 20 to a feeder exchange device (not illustrated) (S270). After the feeder exchange instruction is input, the feeder exchange device executes the exchange operation of feeder 20 with respect to mounting device main body 11.

After S190 or S270, CPU 81 ends the present routine. Such processing of steps S100 to S270 is executed for multiple suction nozzles 41 held by rotary head 44.

Figure 15:
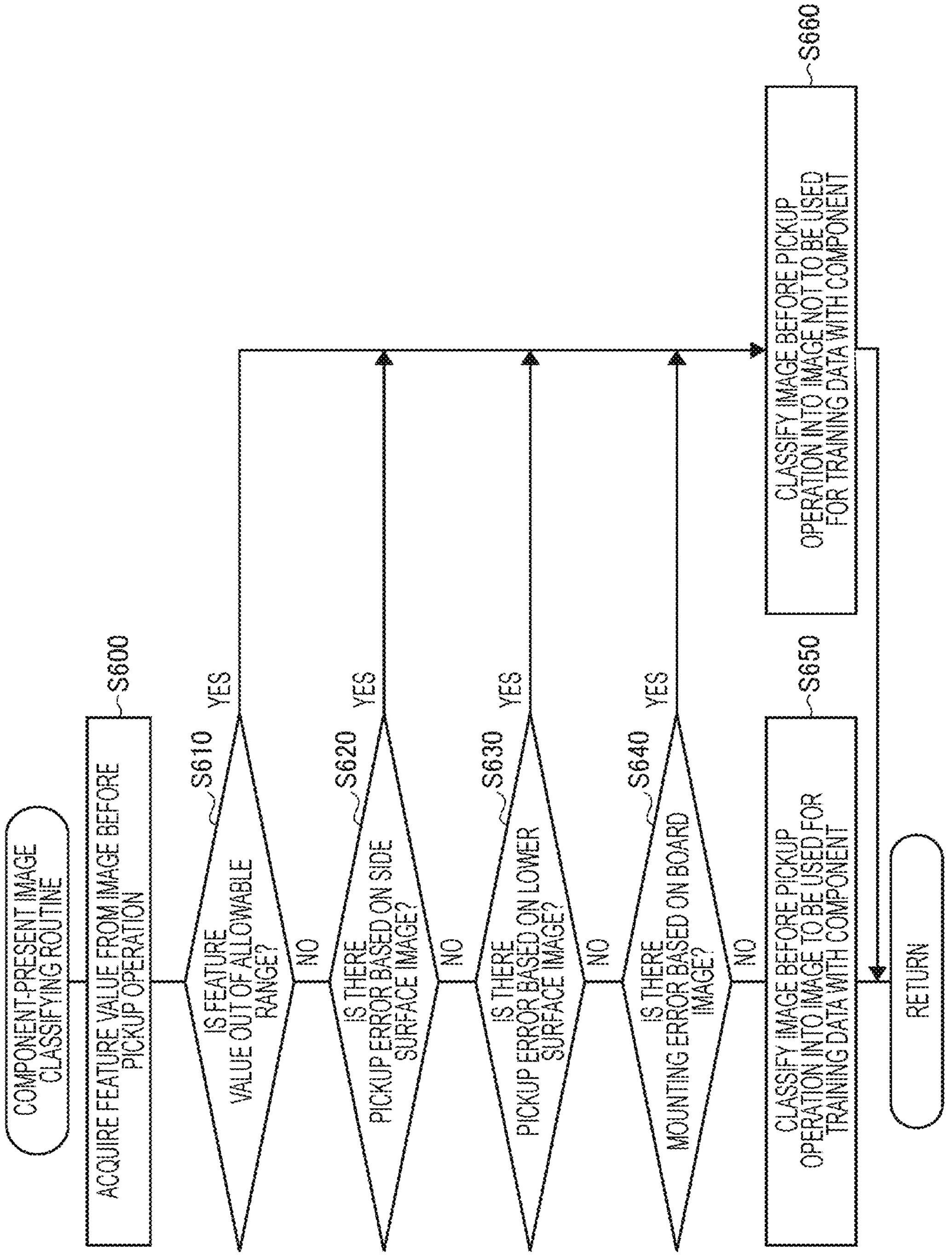
FIG. 15 is a diagram illustrating an example of a component-present image classifying routine.

Hereinafter, an operation of management server 90 will be described. In particular, an operation for classifying images used for creating a trained model (machine learning) will be described. First, a component-present image classifying routine executed by management server 90 will be described with reference to FIG. 15. FIG. 15 is a flowchart illustrating an example of the component-present image classifying routine. This routine is stored in storage 93 of management server 90. This routine is executed by CPU 91 of management server 90 after image before pickup operation Im1 is input from controller 80.

When this routine is started, CPU 91 first acquires a feature value from image before pickup operation Im1 (S600). Here, the feature value is, for example, an average value of the luminance values of each pixel constituting image before pickup operation Im1. Next, CPU 91 determines whether the feature value acquired in S600 is out of the allowable range (S610). For example, the allowable range is set based on an average value of feature values in multiple images before pickup operation Im1 classified into images to be used for the training data with a component in the past, variation of the feature values in such multiple images before pickup operation Im1, or the like. When a negative determination is made in S610, CPU 91 determines whether a pickup error based on side surface image Im3 is stored in storage 93 (S620). When a negative determination is made in S620, CPU 91 determines whether a pickup error based on the lower surface image is stored in storage 93 (S630). When a negative determination is made in S630, CPU 91 determines whether a mounting error based on board image Im5 is stored in storage 93 (S640). When a negative determination is made in S640, CPU 91 classifies image before pickup operation Im1 into an image to be used for the training data with a component (S650). On the other hand, when an affirmative determination is made in S610, S620, S630, or S640, CPU 91 classifies image before pickup operation Im1 into an image not to be used for the training data with a component (S660). After S650 or S660, CPU 91 ends the present routine.

Here, when an affirmative determination is made in S610, the reason why CPU 91 classifies image before pickup operation Im1 into an image not to be used for the training data with a component (S660) is as follows, for example. That is, image before pickup operation Im1 used for the training data with a component is an image of component supply position F in a state where a component is present in cavity 21*a* of tape 21, and image before pickup operation Im1 not used for the training data with a component is an image of component supply position F in a state where component P is absent in cavity 21*a* of tape 21. In a state where component P is present in cavity 21*a*, component P and the bottom surface of cavity 21*a* are captured in image before pickup operation Im1. On the other hand, in a state where the component is absent in cavity 21*a*, only the bottom surface of cavity 21*a* is captured in image before pickup operation Im1. When captured in the image, the luminance values are different between component P and the bottom surface of cavity 21*a*. Therefore, the feature values (average values of luminance values of each pixel constituting image before pickup operation Im1) are different between image before pickup operation Im1 in a state where the component is present in cavity 21*a* and image before pickup operation Im1 in a state where component P is absent in cavity 21*a*. Therefore, CPU 91 classifies image before pickup operation Im1 in which the feature value does not fall within the allowable range into an image not to be used for the training data with a component.

In addition, when an affirmative determination is made in S620, S630, or S640, the reason why CPU 91 classifies image before pickup operation Im1 into an image not to be used for the training data with a component (S660) is as follows, for example. That is, these errors occur in a state where component P is absent in cavity 21*a* or in a state where some type of abnormality occurs in cavity 21*a* or component P accommodated in cavity 21*a* at component supply position F. Therefore, when such an error occurs, CPU 91 classifies image before pickup operation Im1 into an image not to be used for the training data with a component.

Figure 16:
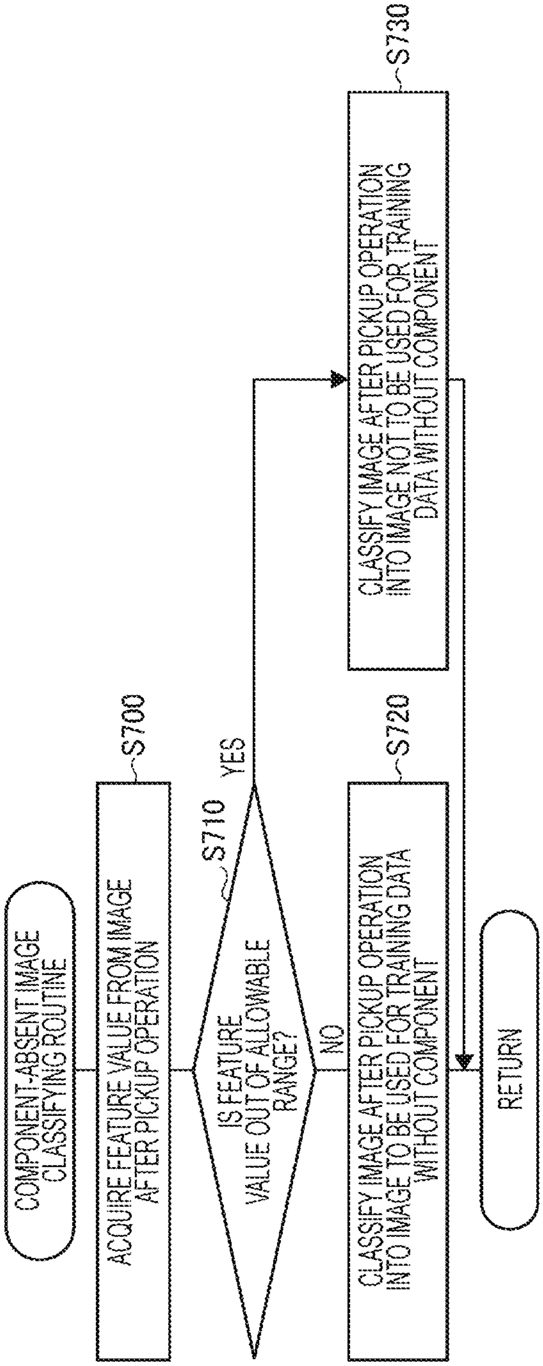
FIG. 16 is a diagram illustrating an example of a component-absent image classifying routine.

Next, a post-pickup image classifying routine executed by management server 90 will be described with reference to FIG. 16. FIG. 16 is a flowchart illustrating an example of the post-pickup image classifying routine. This routine is stored in storage 93 of management server 90. This routine is executed by CPU 91 of management server 90 after image before pickup operation Im1 is input from controller 80.

When this routine is started, CPU 91 acquires a feature value of image after pickup operation Im2 (S700). Here, the feature value is, for example, an average value of the luminance values of each pixel constituting image after pickup operation Im2. Next, CPU 91 determines whether the feature value acquired in S700 is out of the allowable range (S710). For example, the allowable range is set based on an average value of feature values in multiple images after pickup operation Im2 classified into images to be used for the training data without a component in the past, variation of the feature values in such multiple images after pickup operation Im2, or the like. When a negative determination is made in S710, CPU 91 classifies image after pickup operation Im2 into an image to be used for the training data without a component (S720). On the other hand, when an affirmative determination is made in S710, CPU 91 classifies image after pickup operation Im2 into an image not to be used for the training data without a component (S730). After S720 or S730, CPU 91 ends the present routine.

Here, when an affirmative determination is made in S710, the reason why CPU 91 classifies image after pickup operation Im2 into an image not to be used for the training data without a component (S730) is as follows, for example. That is, image after pickup operation Im2 used for the training data without a component is an image of component supply position F in a state where component P is absent in cavity 21*a* of tape 21, and image after pickup operation Im2 not used for the training data without a component is an image of component supply position F in a state where component P is present in cavity 21*a* of tape 21. In a state where component P is absent in cavity 21*a*, only the bottom surface of cavity 21*a* is captured in image after pickup operation Im2. On the other hand, in a state where the component is present in cavity 21*a*, only component P and the bottom surface of cavity 21*a* are captured in image after pickup operation Im2. When captured in the image, the luminance values are different between component P and the bottom surface of cavity 21*a*. Therefore, the feature values (average values of luminance values of each pixel constituting image after pickup operation Im2) are different between image after pickup operation Im2 in a state where the component is absent in cavity 21*a* and image after pickup operation Im2 in a state where component P is present in cavity 21*a*. Therefore, CPU 91 classifies image after pickup operation Im2 in which the feature value is out of the allowable range into an image not to be used for the training data without a component.

As described above, in component mounting system 1, management server 90 classifies image before pickup operation Im1 into an image to be used for the training data with a component or an image not to be used for the training data with a component. In addition, in component mounting system 1, management server 90 classifies image after pickup operation Im2 into an image to be used for the training data without a component or an image not to be used for the training data without a component. In order to create the trained model, it is necessary to prepare a large amount of training data with a component and training data without a component, and thus, in component mounting system 1, compared to a case where the operator visually classifies the training data, the training data with a component and the training data without a component can be obtained more easily.

Here, a correspondence relationship between the elements of the present embodiment and the elements of the component mounting system disclosed in the present description will be described. Component mounting system 1 of the present embodiment corresponds to the component mounting system of the present disclosure, mounting device main body 11 corresponds to the mounting machine main body, mark camera 70, side surface camera 71, and part camera 72 correspond to the camera, controller 80 corresponds to the production control section, controller 80 corresponds to the error detection section, controller 80 corresponds to the imaging processing section, controller 80 corresponds to the inspection section, and management server 90 corresponds to the classification section.

In component mounting system 1 described above, when an error is not detected by controller 80, image before pickup operation Im1 is classified into an image to be used as the training data with a component in the machine learning. Therefore, compared to a case where the operator visually classifies the training data, the training data with a component can be obtained more easily. In addition, when an error is detected by controller 80, there is a high possibility that image before pickup operation Im1 is not suitable as training data with a component. Therefore, it is significant to classify such image before pickup operation Im1 into an image not to be used for the training data with a component.

In addition, in component mounting system 1, management server 90 acquires the feature value from image before pickup operation Im1, and when the feature value is out of the allowable range, classifies image before pickup operation Im1 into an image not to be used as the training data with a component. When the feature value acquired from the image before pickup operation is out of the allowable range, there is a high possibility that some type of abnormality occurs at component supply position F. Therefore, it is significant to classify image before pickup operation Im1 in which the feature value is out of the allowable range into an image not to be used for the training data with a component.

In addition, in component mounting system 1, controller 80 controls mark camera 70 such that an image of component supply position F after the pickup operation is captured, and management server 90 acquires the feature value from image after pickup operation Im2, when the feature value is within the allowable range, classifies image after pickup operation Im2 into an image to be used as the training data without a component, and when the feature value is out of the allowable range, classifies image after pickup operation Im2 into an image not to be used as the training data without a component. Therefore, compared to a case where the operator visually classifies the training data, it is possible to more easily obtain the training data without a component necessary for creating the trained model. In addition, when the feature value is out of the allowable range, there is a high possibility that some type of abnormality occurs at component supply position F. Therefore, it is significant to classify image after pickup operation Im2 in which the feature value is out of the allowable range into an image not to be used for the training data without a component.

In addition, in the image classification method of the above-described embodiment, when an error is not detected by controller 80, image before pickup operation Im1 is classified into an image to be used as the training data with a component in the machine learning. Therefore, compared to a case where the operator visually classifies the training data, the training data with a component can be obtained more easily. In addition, when an error is detected by controller 80, there is a high possibility that image before pickup operation Im1 is not suitable as training data with a component. Therefore, it is significant to classify such image before pickup operation Im1 into an image not to be used for the training data with a component.

It goes without saying that the present disclosure is not limited to the embodiments described above, and can be implemented in various aspects as long as the aspects fall within the technical scope of the present disclosure.

In the embodiment described above, component mounter 10 includes mark camera 70, side surface camera 71, and part camera 72 as cameras of the present disclosure. However, component mounter 10 may include mark camera 70 and side surface camera 71, or may include mark camera 70 and part camera 72.

In the above-described embodiment, controller 80 executes all of the side surface inspection subroutine, the lower surface inspection subroutine, and the post-mounting component inspection subroutine in the production processing routine. However, controller 80 may execute at least one of the side surface inspection subroutine, the lower surface inspection subroutine, and the post-mounting component inspection subroutine in the production processing routine.

In the embodiment described above, when any one of the pickup error based on side surface image Im3, the pickup error based on lower surface image Im4, and the mounting error based on board image Im5 is detected, management server 90 classifies image before pickup operation Im1 into an image not to be used for the training data with a component. However, when two errors among the pickup error based on side surface image Im3, the pickup error based on lower surface image Im4, and the mounting error based on board image Im5 are detected, management server 90 may classify image before pickup operation Im1 into an image not to be used for the training data with a component, and when three errors are detected, management server 90 may classify image before pickup operation Im1 into an image not to be used for the training data with a component.

In the embodiment described above, the side surface inspection subroutine, the lower surface inspection subroutine, and the post-mounting component inspection subroutine are executed by controller 80, and the component-present image classifying routine and the component-absent image classifying routine are executed by management server 90. However, controller 80 may execute at least one of the component-present image classifying routine and the component-absent image classifying routine, or management server 90 may execute at least one of the side surface inspection subroutine, the lower surface inspection subroutine, and the post-mounting component inspection subroutine.

In the embodiment described above, controller 80 determines whether there is a mounting error based on board image Im5 captured by mark camera 70. However, board visual inspection device 7 may determine whether there is a mounting error based on a visual inspection image captured by the device.

In the embodiment described above, when the operator confirms that component P is present in image before pickup operation Im1 classified into the image not to be used for the training data with a component, management server 90 may be able to input the reclassification instruction input by the operator via input device 95. When the reclassification instruction is input, management server 90 reclassifies image before pickup operation Im1 into an image to be used for the training data with a component.

In the embodiment described above, the present disclosure has been described as component mounting system 1, but may be described as an image classification method.

INDUSTRIAL APPLICABILITY

The present disclosure can be applied to an industry accompanying an operation of mounting a component on a board.

REFERENCE SIGNS LIST

1: Component mounting system, 3: Solder paste printing device, 4: Solder paste inspection device, 5: Mounting line, 6: Reflow device, 7: Board visual inspection device, **8*a* to 8*c*: Intermediate conveyor, 10: Component mounter, 11: Mounting device main body, 12: Board conveyance device, 13: Head moving device, 14: Y-axis guide rail, 15: Y-axis slider, 16: Y-axis actuator, 17: X-axis guide rail, 18: X-axis slider, 19: X-axis actuator, 20: Feeder, 21: Tape, 21*a*: Cavity, 21*b*: Sprocket hole, 40: Head unit, 41: Suction nozzle, 42: Nozzle holder, 42*a*: Upper end portion, 42*b*: Flange section, 44: Rotary head, 45: Spring, 46: R-axis actuator, 47: Rotation shaft, 48: Drive motor, 49: Q-axis actuator, 50: Z-axis actuator, 52: Ball screw nut, 54: Screw shaft, 56: Z-axis slider, 57: Lever section, 58: Drive motor, 60: Solenoid valve, 61: CPU, 70: Mark camera, 71: Side surface camera, 72: Part camera, 80: Controller, 81: CPU, 82: ROM, 83: Storage, 84: RAM, 90: Management server, 91: CPU, 92: ROM, 93: Storage, 94: RAM, 95: Input device, 96: Display, F: Component supply position, Im1: Image before pickup operation, Im2: Image after pickup operation, Im3: Side surface image, Im4: Lower surface image, Im5**: Board image, P: Component, S: Board, WP: Work position

The invention claimed is:

1. A component mounting system comprising:

a mounting machine main body including a head holding a pickup member capable of picking up a component supplied from a feeder to a component supply position and a head moving device configured to move the head, the mounting machine main body being capable of mounting the component picked up by the pickup member on a board;

one or more cameras configured to capture images of at least one of a pickup state of the component with respect to the pickup member and a mounting state of the component with respect to the board, and the component supply position;

a production control section configured to control the head and the head moving device such that a pickup operation of picking up the component by the pickup member and a mounting operation of mounting the component picked up by the pickup member on the board are executed, and control the camera such that a captured image of at least one of the pickup state of the component with respect to the pickup member after the pickup operation and the mounting state of the component with respect to the board after the mounting operation is obtained to produce the board;

an error detection section configured to execute at least one of error detection processing of detecting a pickup error based on the captured image in the pickup state and error detection processing of detecting a mounting error based on the captured image in the mounting state during production of the board;

an imaging processing section configured to capture an image of the component supply position before the pickup operation by the camera;

an inspection section configured to inspect presence or absence of the component at the component supply position by applying a captured image of the component supply position before the pickup operation acquired by the imaging processing section to a trained model obtained by machine learning using multiple captured images of the component supply position before the pickup operation as input data and the presence or absence of the component at the component supply position as training data; and a classification section configured to classify the captured image of the component supply position before the pickup operation into an image to be used as the training data with a component when an error is not detected by the error detection section in the machine learning, and classify the captured image of the component supply position before the pickup operation acquired by the imaging processing section into an image not to be used as the training data with a component when the error is detected by the error detection section.

2. The component mounting system according to claim 1, wherein the classification section acquires a feature value from the captured image of the component supply position before the pickup operation, and when the feature value is out of an allowable range, classifies the captured image of the component supply position before the pickup operation into the image not to be used as the training data with a component even when the error is not detected.

3. The component mounting system according to claim 1, wherein the production control section controls the camera such that an image of the component supply position after the pickup operation is captured, and the classification section acquires a feature value from the captured image of the component supply position after the pickup operation, classifies the captured image of the component supply position after the pickup operation into an image to be used as the training data without a component when the feature value is within an allowable range, and classifies the captured image of the component supply position after the pickup operation into an image not to be used as the training data without a component when the feature value is out of the allowable range.

4. An image classification method used in a component mounting system including a mounting machine main body including a head holding a pickup member capable of picking up a component supplied from a feeder to a component supply position and a head moving device configured to move the head, the mounting machine main body being capable of mounting the component picked up by the pickup member on a board, one or more cameras configured to capture images of at least one of a pickup state of the component with respect to the pickup member and a mounting state of the component with respect to the board, and the component supply position, a production control section configured to control the head and the head moving device such that a pickup operation of picking up the component by the pickup member and a mounting operation of mounting the component picked up by the pickup member on the board are executed, and control the camera such that a captured image of at least one of the pickup state of the component with respect to the pickup member after the pickup operation and the mounting state of the component with respect to the board after the mounting operation is obtained to produce the board, an error detection section configured to execute at least one of error detection processing of detecting a pickup error based on the captured image in the pickup state and error detection processing of detecting a mounting error based on the captured image in the mounting state during production of the board, an imaging processing section configured to capture an image of the component supply position before the pickup operation by the camera, and an inspection section configured to inspect presence or absence of the component at the component supply position by applying the captured image of the component supply position before the pickup operation acquired by the imaging processing section to a trained model obtained by machine learning using multiple captured images of the component supply position before the pickup operation as input data and the presence or absence of the component at the component supply position as training data, the method comprising:

classifying the captured image of the component supply position before the pickup operation into an image to be used as the training data with a component when an error is not detected by the error detection section in the machine learning; and classifying the captured image of the component supply position before the pickup operation acquired by the imaging processing section into an image not to be used as the training data with a component when the error is detected by the error detection section.

* * * * *